(12) United States Patent
Lin

(10) Patent No.: US 7,735,698 B2
(45) Date of Patent: Jun. 15, 2010

(54) NO-DRIP CARAFE

(76) Inventor: Shin-Shuoh Lin, 27022 Falling Leaf Dr., Laguna Hills, CA (US) 92653

( * ) Notice: Subject to any disclaimer, the term of this patent is extended or adjusted under 35 U.S.C. 154(b) by 332 days.

(21) Appl. No.: 11/897,695

(22) Filed: Aug. 31, 2007

(65) Prior Publication Data

US 2009/0057349 A1   Mar. 5, 2009

(51) Int. Cl.
*A47G 19/14* (2006.01)
(52) U.S. Cl. ............... 222/472; 222/475.1; 222/517; 222/571
(58) Field of Classification Search ............ 222/472, 222/475, 1, 470, 471, 473, 474, 517, 571; D7/317, 318
See application file for complete search history.

(56) References Cited

U.S. PATENT DOCUMENTS

| | | | | |
|---|---|---|---|---|
| 2,154,581 | A * | 4/1939 | Pershall | 222/473 |
| 3,331,522 | A * | 7/1967 | Bridges | 220/592.27 |
| 3,424,338 | A * | 1/1969 | Kazel | 220/269 |
| 3,799,408 | A | 3/1974 | Palmer | |
| 4,625,884 | A | 12/1986 | Zimmerman | |
| 4,648,535 | A * | 3/1987 | Zimmermann | 222/472 |
| 4,676,411 | A * | 6/1987 | Simasaki | 222/517 |
| 4,754,888 | A | 7/1988 | Letsch | |
| D307,229 | S | 4/1990 | Grolman | |
| 4,921,146 | A * | 5/1990 | Salzmann | 222/472 |
| 5,118,014 | A * | 6/1992 | Hestehave et al. | 222/472 |
| 5,476,186 | A * | 12/1995 | Reilly | 220/212 |
| 5,573,140 | A * | 11/1996 | Satomi et al. | 220/592.27 |
| 5,653,362 | A * | 8/1997 | Patel | 222/472 |
| 5,918,761 | A | 7/1999 | Wissinger | |
| 5,968,618 | A | 10/1999 | Miller | |
| 6,269,984 | B1 | 8/2001 | Murakami | |
| 6,352,166 | B1 * | 3/2002 | Copeland | 222/472 |
| 6,427,880 | B1 * | 8/2002 | Hirose et al. | 222/517 |
| 6,505,752 | B1 | 1/2003 | Rolfes et al. | |
| 6,726,047 | B2 * | 4/2004 | Lin | 220/203.11 |
| 6,752,287 | B1 * | 6/2004 | Lin | 220/254.9 |
| 6,755,120 | B1 * | 6/2004 | Lin | 222/475.1 |
| 6,763,964 | B1 * | 7/2004 | Hurlbut et al. | 220/254.3 |
| 2005/0211727 | A1 * | 9/2005 | Ohm et al. | 222/108 |
| 2005/0269325 | A1 * | 12/2005 | Belcastro | 220/254.3 |
| 2006/0000838 | A1 * | 1/2006 | Santrach | 220/254.9 |

* cited by examiner

*Primary Examiner*—Kevin P Shaver
*Assistant Examiner*—Jonathan Wood
(74) *Attorney, Agent, or Firm*—Gordon K. Anderson

(57) ABSTRACT

A no-drip carafe (10) is taught that is used for storing and serving a hot or cold beverage, which incorporates a vacuum insulated bottle (20) with a lid (30) engaging the top of the bottle. The lid incorporates a pouring spout (34) with a liquid cavity (36) running completely through and also an integral handle for convenience in handling. A spring loaded lever (56) pivotally snaps into the lid with the lever having an integral downwardly projecting plug finger (58) that engages and completely obstructs the liquid cavity when at rest. When the lever is manually depressed the plug finger is pivoted away from the liquid cavity permitting the beverage to flow freely and when released the integral downwardly projecting plug finger seals the cavity in a no-drip manner.

5 Claims, 5 Drawing Sheets

NO-DRIP CARAFE

TECHNICAL FIELD

The present invention relates to liquid containing vessels in general. More specifically the invention is for a carafe for storing and serving hot or cold beverages that include a combination of elements eliminating dripping after use.

BACKGROUND ART

Previously, many types of vacuum carafes and beverage containers have been used in endeavoring to provide an effective means to store and serve hot or cold liquid beverages to prevent heat transfer while affording convenient handling.

The prior art listed below did not disclose patents that possess any of the novelty of the instant invention; however the following U.S. patents are considered related:

| Patent Number | Inventor | Issue Date |
| --- | --- | --- |
| 3,799,408 | Palmer | Mar. 26, 1974 |
| 4,625,884 | Zimmermann | Dec. 2, 1986 |
| 4,754,888 | Letsch et al. | Jul. 5, 1988 |
| D307,229 | Grolman | Apr. 17, 1990 |
| 5,653,362 | Patel | Aug. 5, 1997 |
| 5,918,761 | Wessinger | Jul. 6, 1999 |
| 5,968,618 | Miller | Oct. 19, 1999 |
| 6,269,984 | Murakami | Aug. 7, 2001 |
| 6,505,752 | Rolfes et al. | Jan. 14, 2003 |

Palmer in U.S. Pat. No. 3,799,408 teaches an internally threaded mounting ring engaged to the threaded neck of a vacuum bottle. A sleeve is provided having a small diameter end for engagement with the bottle neck. The outer large diameter of the sleeve faces outwardly and a tapered stopper-type closure swings on an arm for engagement. The closure is manipulated at the handle to swing the stopper into and out of position closing the opening in the vacuum bottle.

U.S. Pat. No. 4,625,884 issued to Zimmermann is for an insulated jug having a protective housing of synthetic material forming a spout. A recess is formed in the top to receive a lid that is threaded on its lower portion with insertion providing a seal. Pouring is accomplished through the relieved portion on the threaded part of the lid.

Letsch et al. in U.S. Pat. No. 4,754,888 discloses a thermos carafe with an inner container surrounded by a casing. The inner container and the casing are open on the top which is closed using a plug. The plug and/or the opening are shaped in such a manner that it is possible to fill and empty the inner container while the plug is left in the opening.

Patel in U.S. Pat. No. 5,653,362 teaches a beverage server having a body with an internal reservoir to hold a beverage such as hot coffee. A lid is pivotally connected to the top of the body. The lid has a conical passage permitting a beverage to pass into the reservoir without removing the lid. A floatable ball is located in the passage for sealing when no liquid is entering the server. A pouring spout extends from the body and is in fluid communication with the reservoir when the beverage server is tilted and the lid pivots. A counterweight in the lid assists smooth motion functioning.

U.S. Pat. No. 5,968,618 disclosed by Miller is for a thermal coffee carafe having the shape similar to the appliance's factory supplied carafe so that the carafe may fit on the heat generation surface of the appliance in place of the factory supplied carafe.

U.S. Pat. No. 6,269,984 issued to Murakami is for a dispensing stopper for a bottle eliminating accumulated residue. The stopper includes a base mounted on the bottle mouth, a seal on the base and a movable gasket moving toward and away from the sealing surface on the bottle. A thin web of resilient material seals a fixed section and the gasket section.

For background purposes and as indicative of the art to which the invention is related reference may be made to the remaining cited patents issued to Wessinger U.S. Pat. No. 5,918,761, Rolfes et al. U.S. Pat. No. 6,505,752 and Grolman in U.S. design Pat. D307,229.

DISCLOSURE OF THE INVENTION

There are many types of carafes and beverage containers in present use that are used to store and serve liquid beverages however there is always the problem of having the liquid drip the last drop or two when the pouring is finished. While this problem has been with us for centuries many have attempted to solve the dilemma using sliding covers, plugs, screw-on lids and the like however the result requires either a second manual operation or the seal is inefficient.

It is therefore a primary object of the invention to provide a no-drip seal that has a resilient cover with flexible chevrons that create a positive closure every time a lever on top of the lid is released using a spring to make the action automatic.

An important object of the invention is that its operation requires only one hand. An ordinary carafe either has an open top or a hinged lid and liquid is poured when the lid is held open manually. Some carafes have a spring loaded lid and others the lid closes by gravity. The invention utilizes a system that does not rely on a tight relationship between the hinged lid and the pouring spout but instead a separate downwardly projecting plug finger that includes a resilient cover on a lever that penetrates a liquid cavity within the lid. This frictional relationship between two mating parts is liquid tight and yet is easy to use as the lever provides the increased force necessary to raise the plug finger when pouring and the compression spring has sufficient power to replace the stopper in the cavity when manually released.

Still another object of the invention is that many conventional carafes are made of glass or metal with a single wall construction and no insulation at all and the instant invention utilizes a stainless steel vacuum insulated bottle that prevents dangerous contact with the outside surface of the carafe in the case of hot newly brewed coffee and tea. Normally a hot plate is necessary to keep the liquid hot, usually furnished with the brewing apparatus; however the invention eliminates the potential danger along with the necessity of relying on a separate heat source. The insulation in the form of a vacuum within a double wall is sufficient to keep the temperature, either hot or cold, for long periods of time precluding the necessity of returning the carafe to a specific location when serving.

Yet another object of the invention is the ergonomic configuration of the handle as it is designed to fit perfectly in the users hand and is precisely balanced for carrying and pouring.

A final object of the invention is its ease of cleaning as the parts are completely separable and require only cleaning with warm soapy water with no bleach or chlorine added. There are only three separate parts, the bottle, the lid and the lever. The bottle is completely self contained and includes a bottom resilient cushion. The inside of the bottle is seamless and easy to clean with a brush as the open top is sufficiently large to provide access inside. The lid screws onto the bottle and the lever snaps into the lid making disassembly understandably easy.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
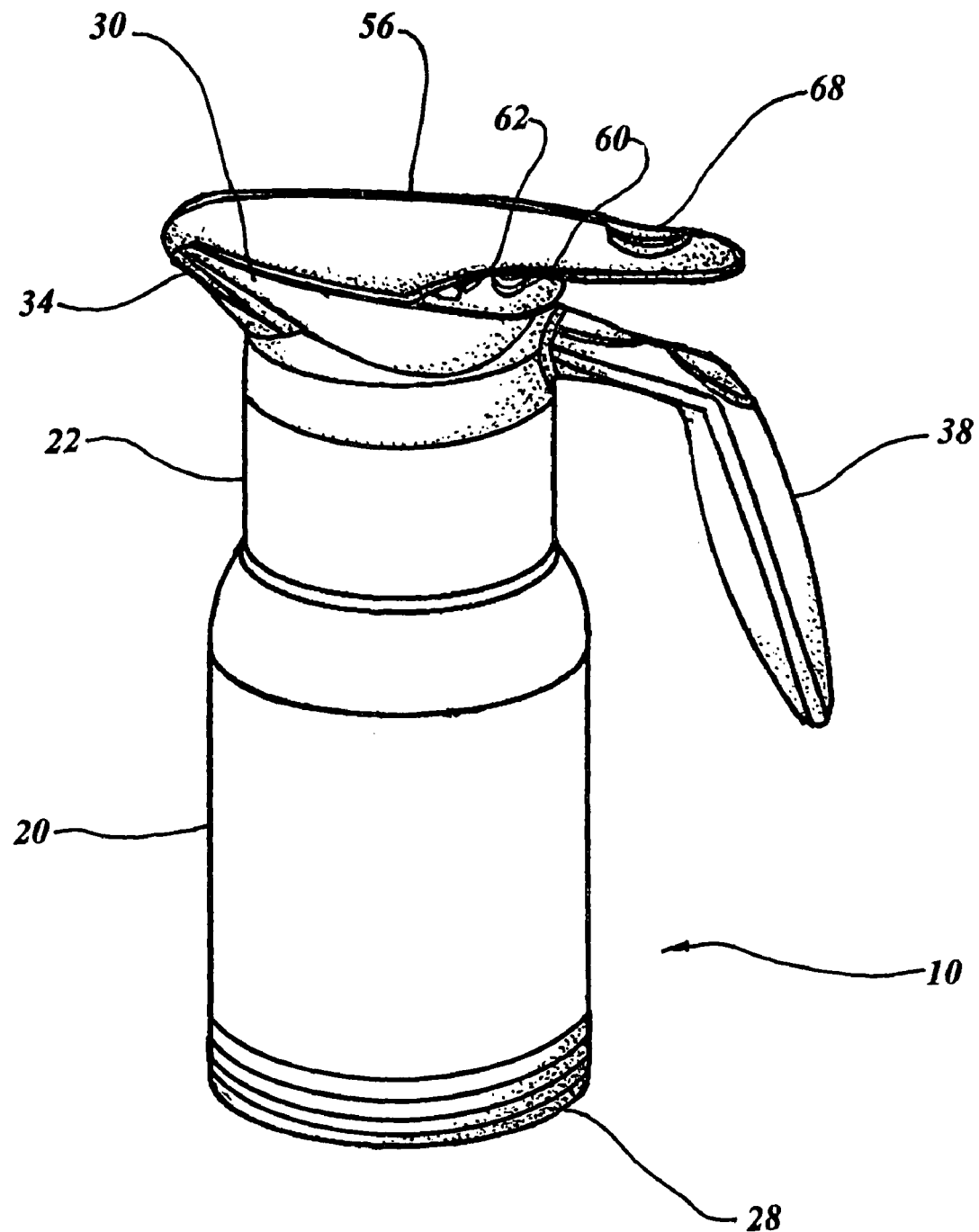
FIG. 1 is a partial isometric view of the no-drip carafe in the preferred embodiment.
Figure 9:
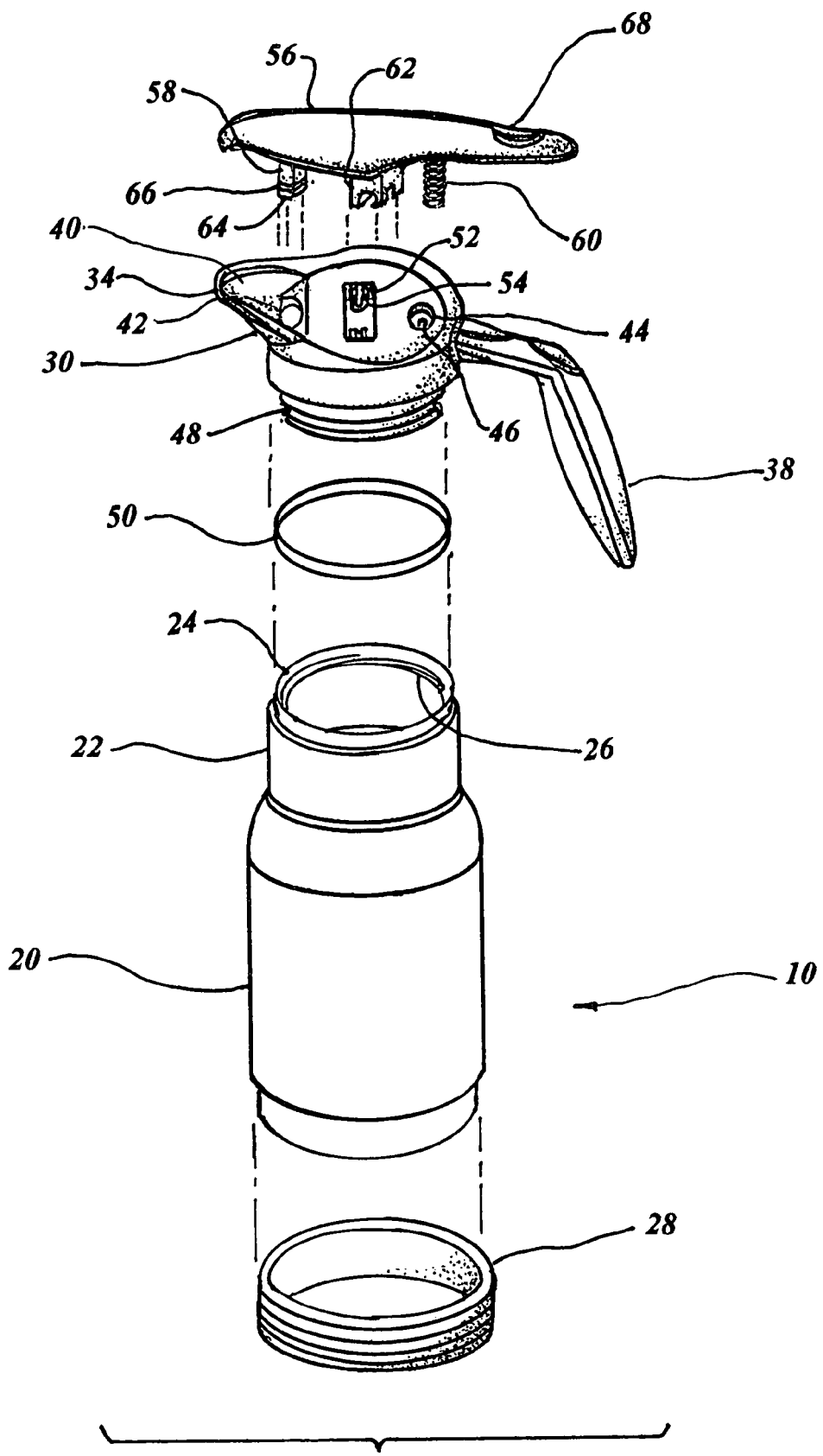
FIG. 9 is an exploded view of the no-drip carafe in the preferred embodiment.

The best mode for carrying out the invention is presented in terms of a preferred embodiment of the no-drip carafe 10. This preferred embodiment of the carafe 10 used for storing and serving a hot or cold beverage is illustrated in FIGS. 1 thorough 9 and is comprised of a vacuum insulated double wall bottle 20 having a neck 22 with an open top 24, also the bottle includes female threads 26 positioned within the neck 22 adjacent to the open top 24. The vacuum insulated bottle 20, shown individually in FIG. 9 is preferably a stainless steel construction with a seamless inside surface and includes a bottom cushion 28 attached underneath for protecting surfaces upon which the carafe 10 is placed.

Figure 7:
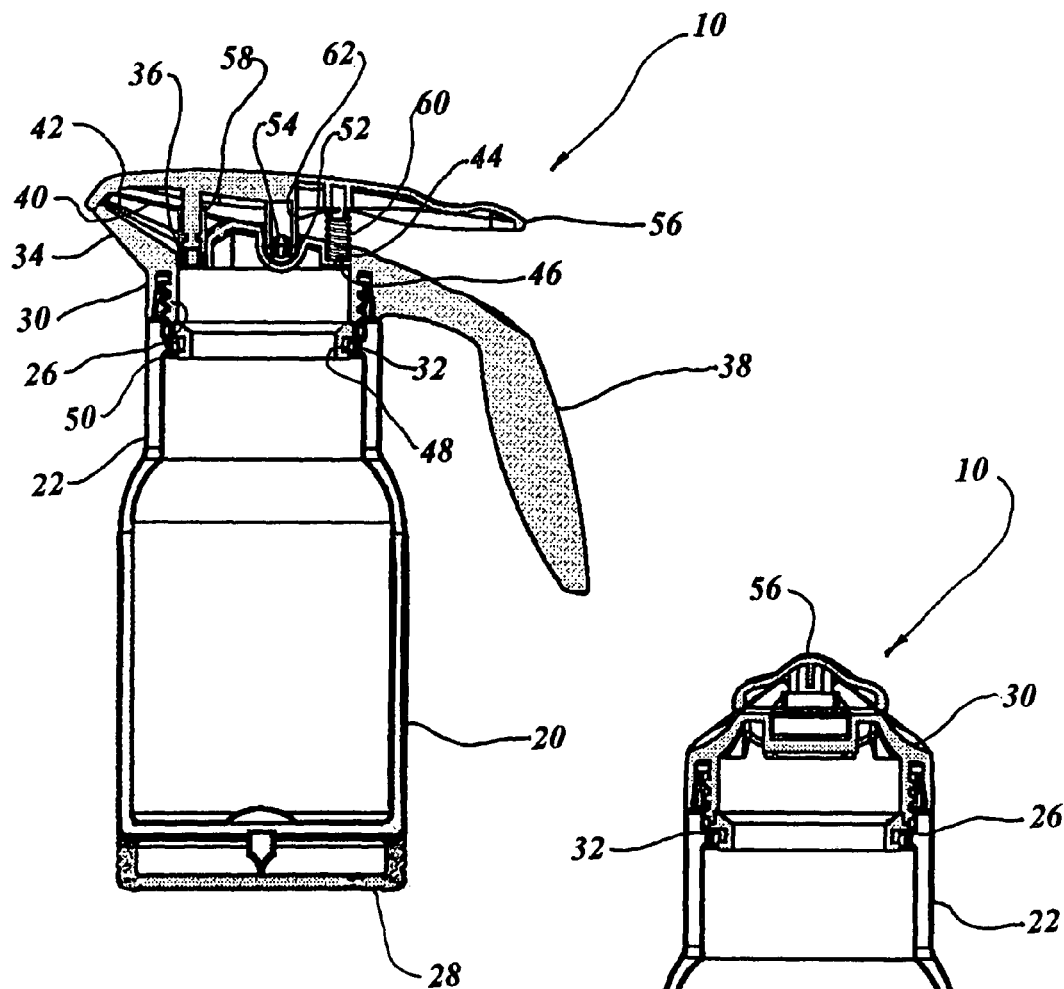
FIG. 7 is a cross sectional view taken along lines 7-7 of FIG. 4.
Figure 8:
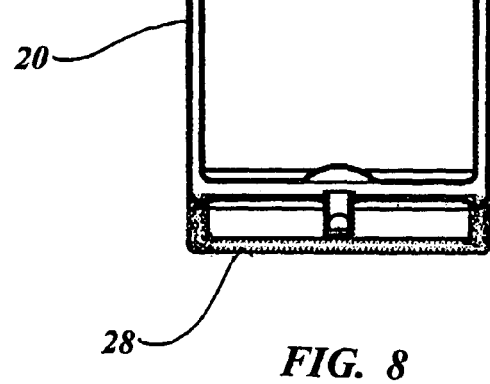
FIG. 8 is a cross sectional view taken along lines 8-8 of FIG. 4.

A lid 30, including peripheral male threads 32 threadably engage the female threads 26 of the bottle 20 as shown in FIGS. 7 and 8. The lid 30 has a pouring spout 34, illustrated best in FIG. 9, with a liquid cavity 36 continuing completely therethrough permitting the beverage to flow from the bottle 20 onto the pouring spout 34. The pouring spout 34 of the lid 30 preferably has a dish shaped portion 40 with a smooth distal end 42 for directing the beverage in a convenient path from the carafe 10.

The lid 30 incorporates an integral handle 38 used for lifting and pouring beverages through the liquid cavity 36 onto the pouring spout 34 of the carafe 10. A spring retaining cavity 44 is located adjacent to the handle 38, as shown in FIGS. 7 and 9 with the spring retaining cavity 44 including a vent opening 46 in a bottom portion of the cavity 44 for stabilizing ambient pressure within the carafe 10 when the beverage is poured therefrom.

The lid 30 also incorporates a recessed groove 48 adjacent to the male threads 32 with a resilient lip seal 50 disposed within this recessed groove 48 for sealing the lid 30 to the vacuum insulated bottle 20 when attached together. A lever receiving cavity 52, is formed within the lid 30 and contains at least two inwardly facing opposed spindles 54, illustrated best in the cross section of FIG. 7.

A spring loaded thumb actuated lever 56 pivotally engages the lid 30 to complete the assembly of the carafe 10. The lever 56 includes an integral downwardly projecting plug finger 58 which is used to obstruct the pouring spout liquid cavity 36 when the lever 56 is urged by a compression spring 60 to an at rest position. When the lever 56 is depressed by an operator's thumb, the plug finger 58 is pivoted away from the liquid cavity 36 permitting the beverage to flow freely and when released the plug finger 58 returns automatically to the cavity 36 by spring pressure thereby preventing dripping.

The lever 56 incorporates at least one downwardly depending leg 62 that pivotally interfaces by snapping over the spindles 54 that are located within the lever receiving cavity 52 of the lid 30, as shown in FIGS. 7 and 9.

The integral downwardly projecting plug finger 58 has a resilient plug cover 64 that slips over the finger 58 and incorporates a number of outwardly extending peripheral chevrons 66 that resistibly collapse when urged by the lever 56 into the liquid cavity 36 creating the desired drip-proof seal.

Figure 2:
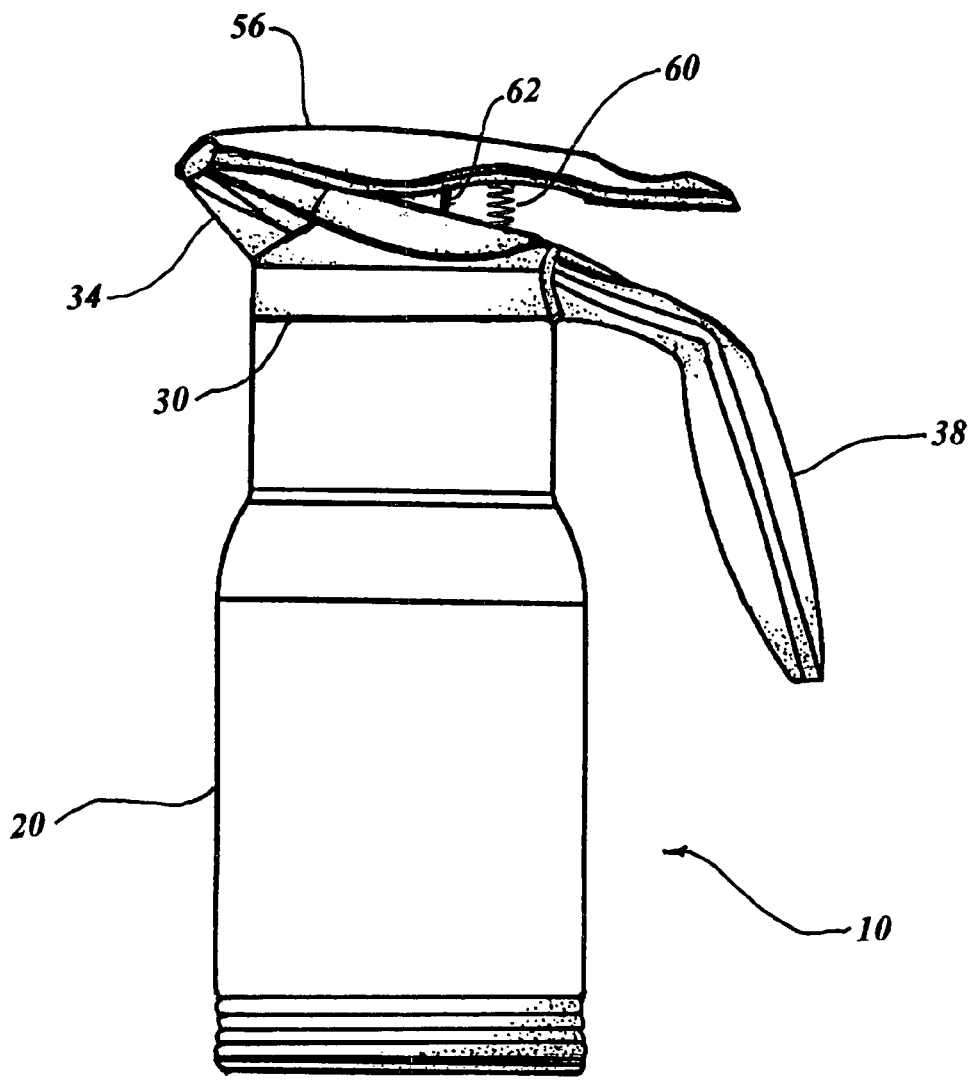
FIG. 2 is a left side view of the no-drip carafe in the preferred embodiment with the right side a mirror image thereof.
Figure 3:
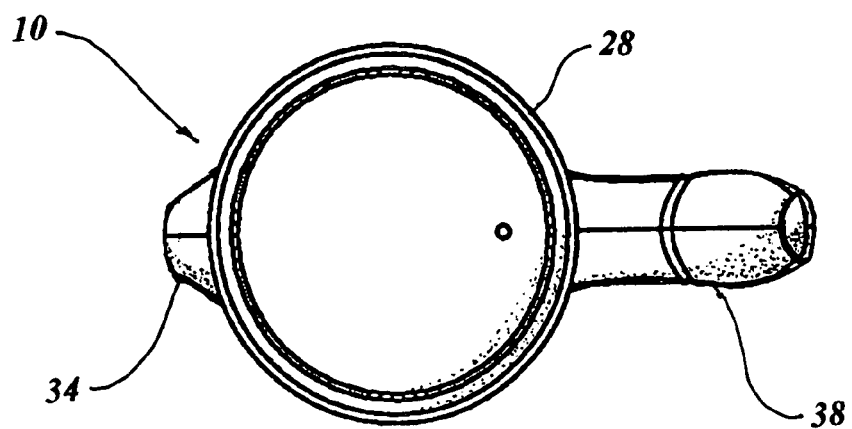
FIG. 3 is a bottom view of the no-drip carafe in the preferred embodiment.
Figures 4, 5, 6:
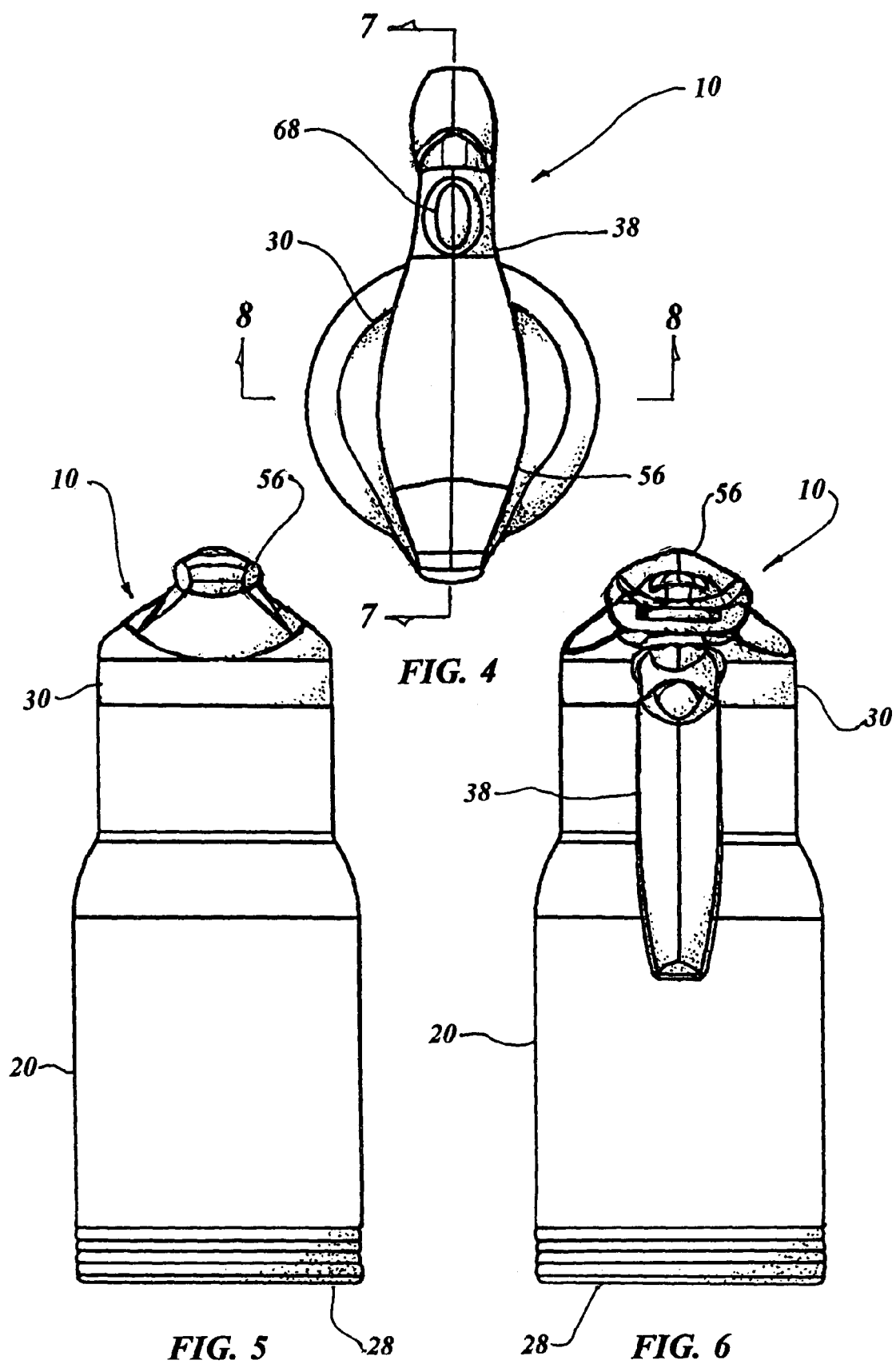
FIG. 4 is a top view of the no-drip carafe in the preferred embodiment.
FIG. 5 is a front side view of the no-drip carafe in the preferred embodiment.
FIG. 6 is a rear view of the no-drip carafe in the preferred embodiment.

The compression spring 60, shown best in FIGS. 2, 7 and 9, is preferably formed of stainless steel and is disposed between the lid 30 and the lever 56 forcing the lever 56 to be tightly closed against the lid 30 when not in use and at rest. The lever 56 preferably includes a thumb depression 68 for assisting in manual alignment when depressing the lever 56 for pouring the beverage from the carafe 10.

The lid 30 and lever 56 may be manufactured from a material consisting of polypropylene, acrylic, allyl diglycol carbonate, polycarbonate, polystyrene, polysulfone, polyester sulfone or polyester.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A no-drip carafe for storing and serving a hot or cold beverage, which comprises:

a vacuum insulated bottle having a neck with an open top, the bottle having female threads positioned within the neck adjacent to the open top, a lid having male threads thereon threadably engaging the female threads of said bottle, said lid having a pouring spout with a liquid cavity therethrough and, an integral handle, for lifting and pouring beverages through the cavity from the carafe, said lid pouring spout further comprising a dish shaped portion with a smooth distal end for directing the beverage in a convenient path from the carafe, wherein said lid has a spring retaining cavity adjacent to the integral handle, and wherein said spring retaining cavity has a vent opening in a bottom portion thereof for stabilizing pressure within the carafe when the beverage is poured therefrom, a spring loaded thumb actuated lever pivotally engaging said lid, said lever having an integral downwardly projecting plug finger obstructing said pouring spout liquid cavity when the lever is urged by a compression spring to an at rest position, wherein the compression spring resides in the spring retaining cavity and concentrically surrounds the vent opening, and wherein when the lever is manually depressed by an operators thumb the integral downwardly projecting plug finger is pivoted away from the liquid cavity permitting the beverage to flow freely and when the lever is released the plug finger seals the cavity in a no-drip manner, and wherein said plug finger has a resilient plug cover disposed thereon.

2. The no-drip carafe as recited in claim 1 wherein said lid further has a lever receiving cavity therein, with said lever receiving cavity having at least two inwardly facing opposed spindles.

3. The no-drip carafe as recited in claim 2 wherein said lever further has at least one downwardly depending leg pivotally interfacing with said at least one spindle within said lever receiving cavity.

4. The no-drip carafe as recited in claim 3 wherein said at least one downwardly depending leg snaps over said at least one spindle.

5. The no-drip carafe as recited in claim 1 wherein said resilient plug cover has a plurality of outwardly extending peripheral chevrons that resistibly collapse when urged by said spring loaded lever into said liquid cavity creating a drip proof seal.

\* \* \* \* \*